Aug. 21, 1951  J. B. ROOTH  2,565,046
ROASTER TRAY AND PLATTER
Filed Jan. 11, 1950  2 Sheets-Sheet 1

Inventor:
Josephine B. Rooth,
by Kenway, Jenney, Witter & Hildreth
Attorneys

Aug. 21, 1951 J. B. ROOTH 2,565,046
ROASTER TRAY AND PLATTER
Filed Jan. 11, 1950 2 Sheets-Sheet 2

Inventor:
Josephine B. Rooth,
by Kenway, Jenney, Witter + Hildreth
Attorneys

Patented Aug. 21, 1951

2,565,046

UNITED STATES PATENT OFFICE 2,565,046

ROASTER TRAY AND PLATTER

Josephine B. Rooth, Wellsville, N. Y.

Application January 11, 1950, Serial No. 138,000

1 Claim. (Cl. 99—450)

This invention relates to the art of roasting fowls and the like and primarily concerns a novel tray for supporting the fowl during roasting and cooperating mechanism for conveniently transferring the tray and roasted fowl to the serving platter. The tray has a concave upper face for receiving and supporting the fowl and is provided with four legs to give firm support. The legs extend above and below the tray and are perforated at their upper ends to receive removable bails for lifting the tray and fowl from the pan. The production of an improved tray of this nature by which the roasted fowl can be conveniently transferred to the platter without danger of dropping or breaking the fowl comprises a primary object of the invention.

A further feature of the invention concerns a serving platter having a centrally disposed well and a plurality of recesses disposed about the well in position to receive the downwardly extended ends of the legs. The legs thus firmly anchor the tray and fowl to the platter and prevent movement on the platter during the carving operation. The bails are removable from the tray after transferring the fowl to the platter, thus leaving the fowl fully exposed for carving.

Figure 1:
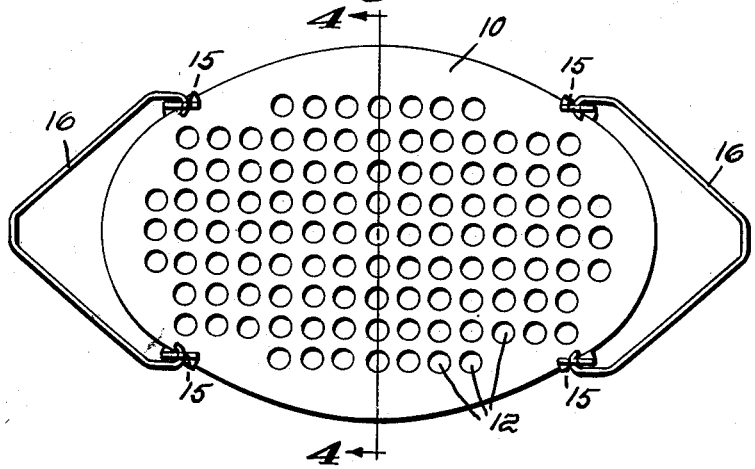
Figure 2:
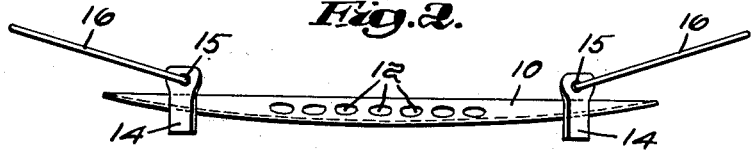
Figure 5:
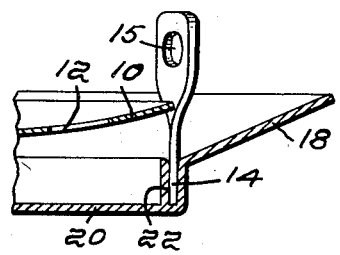
Figure 3:
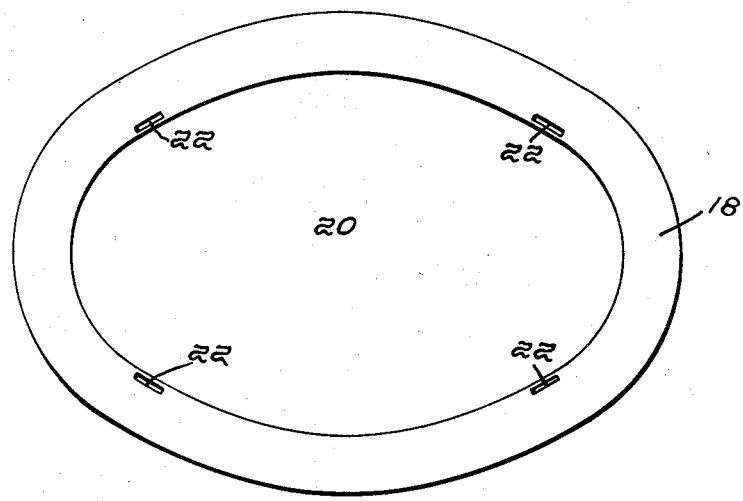
Figure 4:
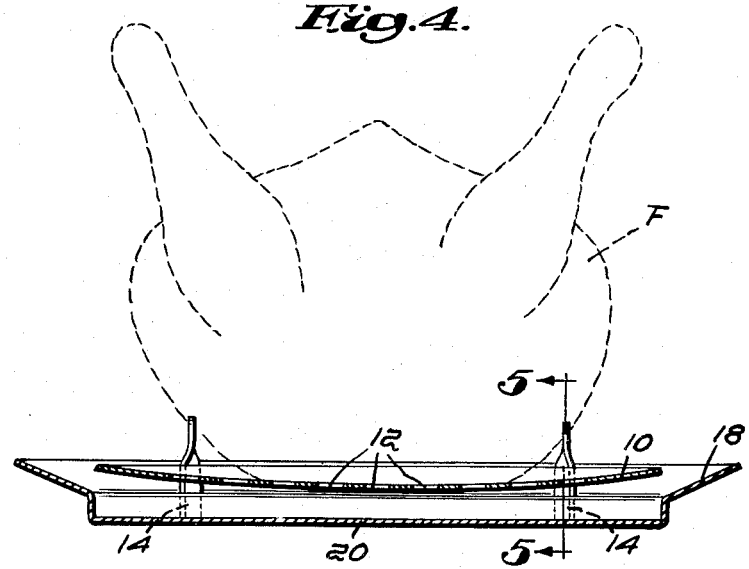

These and other features of the invention will be best understood and appreciated from the following description of a preferred embodiment thereof selected for purposes of illustration and shown in the accompanying drawings in which, Fig. 1 is a plan view of my improved roaster tray, Fig. 2 is a side view of the tray, Fig. 3 is a plan view of my novel serving platter, Fig. 4 is a sectional view through the combined tray and platter taken on line 4—4 of Fig. 1, and Fig. 5 is a fragmentary sectional view taken on line 5—5 of Fig. 4.

In Figs. 1 and 2 I have illustrated a concavo-convex tray 10 preferably constructed of stainless steel, aluminum or some suitable alloy of pleasing appearance. The tray is of oblong configuration and is perforated at 12. Four legs 14 are affixed to the tray adjacent to its two ends and extend above and below the tray. The bottom ends of the legs serve to give firm support to the tray and the top ends are perforated at 15 to receive two tray lifting bails 16.

The tray is adapted to be firmly supported on the legs in the bottom of a roasting pan and its upper concave face is adapted to receive and support a fowl F to be roasted. When the roasting operation is completed, the two bails are inserted in the perforations 15 and are employed to lift the tray and fowl from the pan without danger of dropping or breaking the fowl should it be very tender or well done.

The tray and roasted fowl are transferred directly from the roasting pan to my novel platter 18. The platter has a centrally disposed well 20 and four recesses 22 disposed about the well to receive the bottom ends of the legs 14. Thus the fowl is supported in undisturbed position on the tray which is anchored against movement relative to the platter. The bails are then removed and the fowl thus left in fully exposed position for carving.

It is well known that the transferring of a roasted fowl from the roaster to the serving tray is an unpleasant task attended with some danger of dropping or breaking the fowl, especially since it is hot and slippery. My invention makes this task a simple and safe operation and leaves the fowl supported on the concave and perforated tray in its original roasting position and with the tray secured directly to the platter. It will be apparent that during the roasting operation the fowl becomes somewhat fitted to the tray and it is advantageous to retain this relationship during the carving operation since it cooperates with the anchoring of the tray at 22 to maintain the fowl against undue movement on the platter.

Having thus disclosed my invention what I claim as new and desire to secure by Letters Patent is:

In combination, an oblong and perforated sheet metal roaster tray of concavo-convex configuration, two pairs of legs affixed to the margin of the tray respectively adjacent to the two ends and at opposite sides thereof, each leg extending above and below the tray and having a perforation therein at the upper and concave face of the tray, two bails having hook-like ends detachably engaging the legs in said perforations, and a serving platter having a centrally disposed well and four recesses disposed about the well in position to receive the downwardly extending ends of said legs thereinto, the tray being adapted to rest on said legs at the bottom of a roasting pan with a fowl supported on its upper concave face and said bails being adapted to lift the tray and fowl from the pan and transport them to the platter, the legs within the recesses serving to anchor the tray to the platter and the bails being removable fully to expose the fowl for carving.

JOSEPHINE B. ROOTH.

(References on following page)

REFERENCES CITED

The following references are of record in the file of this patent:

UNITED STATES PATENTS

| Number | Name | Date |
|---|---|---|
| 222,296 | McMurray | Dec. 2, 1879 |
| 403,407 | Armour | May 14, 1889 |
| 824,119 | Howland | June 26, 1906 |
| 847,117 | Salmon | Mar. 12, 1907 |
| 1,630,471 | Collins | May 31, 1927 |
| 2,211,030 | Rutenber | Aug. 13, 1940 |
| 2,504,237 | Weissbach | Apr. 18, 1950 |

FOREIGN PATENTS

| Number | Country | Date |
|---|---|---|
| 520,135 | Great Britain | Apr. 16, 1940 |
| 543,243 | Great Britain | Feb. 16, 1942 |